C. E. RIEDEL.
SCALE.
APPLICATION FILED SEPT. 8, 1914.
1,139,998.
Patented May 18, 1915.
2 SHEETS—SHEET 1.
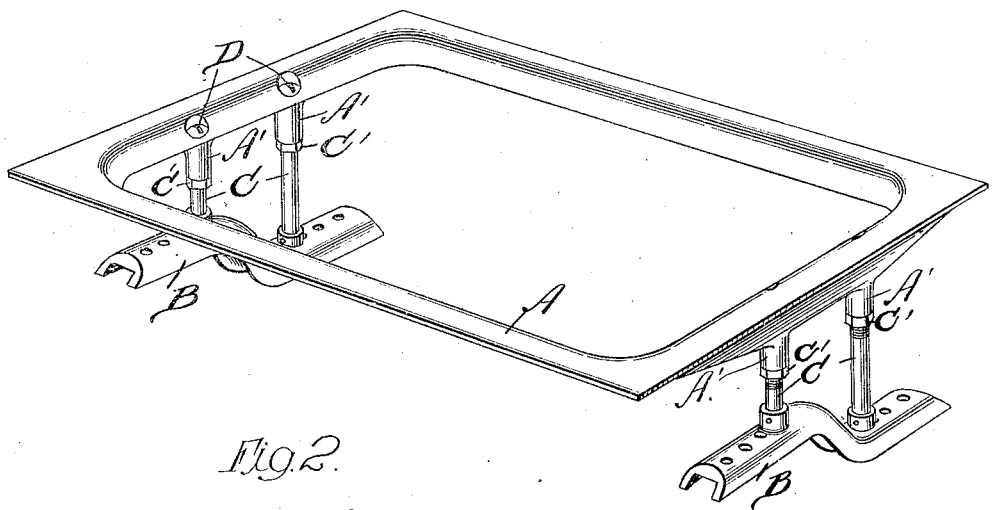
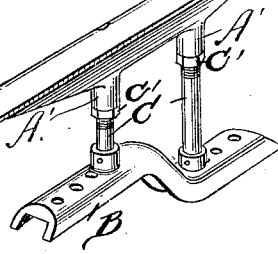
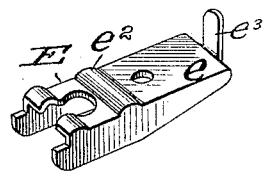
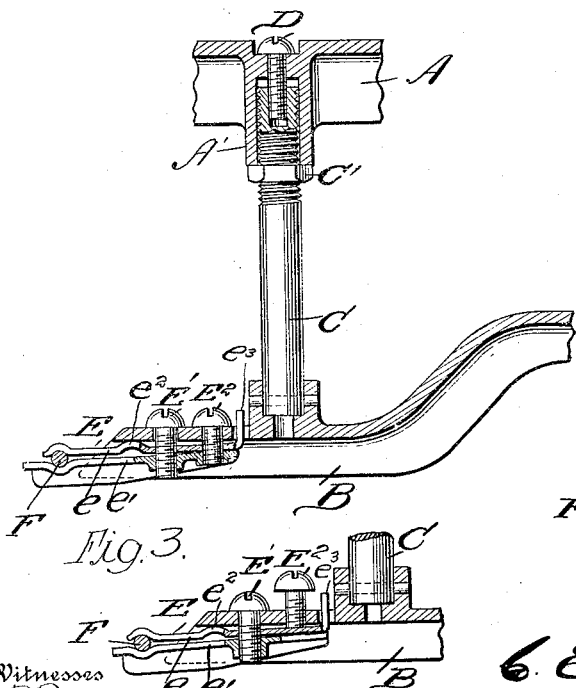
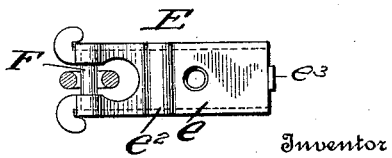
Witnesses
E R Barrett
Lena Weigand
Inventor
C. Edward Riedel
By J. E. Thomas
Attorney

C. E. RIEDEL.
SCALE.
APPLICATION FILED SEPT. 8, 1914.

1,139,998.

Patented May 18, 1915.
2 SHEETS—SHEET 2.

Witnesses
E. R. Barrett
Lena Weigand

Inventor
C. Edward Riedel
By S. E. Thomas
Attorney

THE NORRIS PETERS CO., PHOTO-LITHO., WASHINGTON, D. C.

UNITED STATES PATENT OFFICE.

CHARLES EDWARD RIEDEL, OF DETROIT, MICHIGAN, ASSIGNOR TO DETROIT SCALE MANUFACTURING COMPANY, OF DETROIT, MICHIGAN, A CORPORATION OF MICHIGAN.

SCALE.

1,139,998.  Specification of Letters Patent.  Patented May 18, 1915.

Application filed September 8, 1914. Serial No. 860,528.

*To all whom it may concern:*

Be it known that I, CHARLES EDWARD RIEDEL, citizen of the United States, residing at Detroit, county of Wayne, State of Michigan, have invented a certain new and useful Improvement in Scales, and declare the following to be a full, clear, and exact description of the same, such as will enable others skilled in the art to which it pertains to make and use the same, reference being had to the accompanying drawings, which form a part of this specification.

My invention relates to a platform supporting frame and its means of suspension upon the platform levers for weighing scales of the suspended bearing type, and particularly to the gravity, or compound gravity, and beam type of scale.

Heretofore it has been necessary when shipping scales from the factory to the customer to separate the members forming the platform frame of the various constructions of scales, that they may be removed from the platform levers and base of the scale in order that it may be crated,—it has been found however, in re-assembling the frame and its supporting members by an inexperienced person (as the purchaser is likely to be) that the several parts are apt to be misplaced thus interfering with the accuracy of the scale.

One object therefore of this invention is to provide an integral annular frame, which therefore cannot be separated and which is adapted to be placed in position and removed from the platform levers without disconnecting the hanger loops supporting the agate bearings, or other parts.

Another feature of the invention consists in the adjustable means for truing the bearings with the knife edges of the levers.

Another feature of the invention is the ease with which the loops may be engaged with the knife edge of the levers in re-assembling the parts.

Another feature of the invention consists in the device for supporting the loop pin which may be easily removed when necessary to replace the pin;—an improvement over constructions in which the pin when "rusted in" cannot be readily removed.

Other advantages and improvements will hereafter appear.

Figure 6:
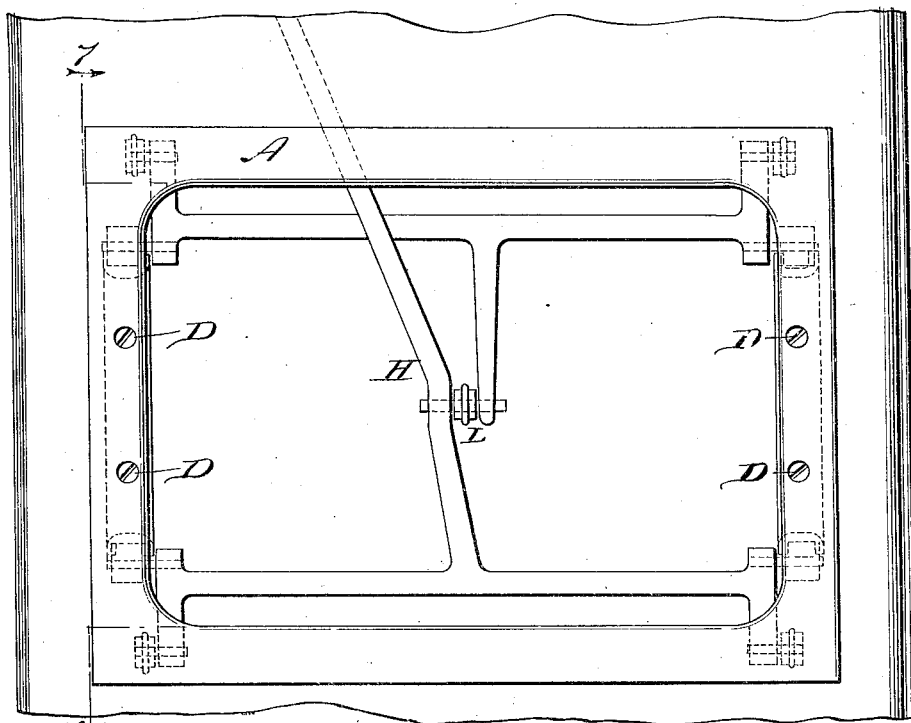
Figure 7:
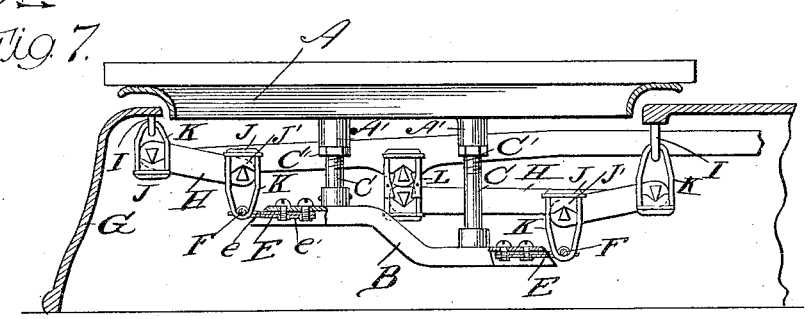

In the drawings:—Figure 1, is a perspective view of the platform supporting frame and adjusting means for truing the bearings. Fig. 2, is a fragmentary detail of the platform frame, with parts in elevation and section showing the adjustable supporting member adapted for suspension from the usual agate bearings. Fig. 3, is a detail of a modification showing an adjustable means for supporting an agate bearing. Fig. 4, is a perspective view of the upper member of the foot bracket. Fig. 5, is a plan view of the same with the supporting link in cross-section. Fig. 6, is a fragmentary plan view of the scale base and the platform lever mechanism with the platform supporting frame in position. Fig. 7, is a vertical sectional view through the base platform frame and supporting lever mechanism taken on line 7—7 of Fig. 6.

Referring now to the letters of reference placed upon the drawings: A denotes an annular integral platform frame having depending sockets A'.

B, B, indicate a pair of stepped frames located directly below the end members of the frame A and adjustably connected thereto by posts C fixedly secured to the stepped frames and adjustably connected with the annular frame A, by screws D, projecting downwardly into the sockets A', and there engaging the upper ends of the posts.

C' denote nuts having a screw threaded engagement with the several posts which upon adjusting in conjunction with the screws D, provides for the proper alinement of the agate bearings supported in the hangers, with the knife edge bearings of the levers, and secures the stepped frame and the annular frame in fixed relation.

E, indicates a foot bracket comprising a pair of clamping members $e$, $e'$, secured to the stepped member by screws $E'$, $E^2$, and recessed at its bifurcated end to receive a latterally disposed pin F.

$e^2$ is a rib formed in the upper member $e$, adapted to bear against the underside of the stepped frame, to secure the foot bracket against displacement upon the adjusting of the screws $E'$ and $E^2$.

In the modification shown in Fig. 3 the altitude of the pin F, carried by the foot bracket may be varied upon the adjustment of the screw $E^2$, which in this case bears upon the member C;—the upturned tongue $e^3$ of the bracket serves as a guide and also to insure against accidental displacement.

G, denotes the base of the scale.

H, indicates the platform lever mechanism.

I, designates loops which are usually cast in the base in this type of scale, but through the shrinkage of the metal are apt to be warped out of position or otherwise misplaced;—it is therefore necessary to provide for a suitable adjustment between the platform frame and the platform lever mechanism to compensate for the variation thus produced, this is sometimes obtained by bending the platform frame.

J, denotes a suitable frame adapted to receive an agate bearing block J', having the usual V-shaped recess to admit the knife edge bearings of the platform lever mechanism. The frames J are provided with bails K, adapted to be looped around the transverse pin F, in the foot brackets carried by the stepped frame. They are also looped through the depending link I, carried by the base of the frame.

L, is a frame to receive opposed V-shaped agate blocks connecting the knife edge bearings of the platform levers.

Having indicated the several parts by reference letters the construction and operation of the device will be readily understood:—As stated in the opening paragraphs of this specification, great difficulty has been experienced in shipping scales from the factory to the customer to provide against error on the part of the customer in re-assembling the platform frame with the platform lever mechanism. The scale being shipped in a partially knock-down condition that it may be properly crated, it will be obvious that the work of re-assembling must be done with the greatest care to insure the accuracy of the scale. It will be apparent however, in the present invention that if the stepped frame is properly adjusted before shipment so that the agate bearings secured thereto by the looped bails are properly alined with he knife edge bearings of the platform levers etc.;—the work of accurately re-assembling the platform frame with the platform mechanism will be simplified to such an extent that it may be accurately and readily accomplished by an inexperienced person.

Having thus described my invention what I claim is:—

1. In a scale, an integral platform frame having depending sockets to receive the ends of a plurality of downwardly projecting legs, adjustable legs fitted within the depending sockets, bolts having a screw threaded connection with the legs for adjustably connecting the legs with the frame, means for locking the legs in their adjustment against accidental displacement, means connected with the legs and adapted to support a plurality of swinging bearings, and swinging frames linked to said means and carrying agate bearings adapted to rest upon the knife edge bearings of the scale mechanism.

2. In a scale, an integral platform frame having depending integral sockets formed thereon for receiving the ends of a plurality of downwardly projecting legs, adjustable legs threaded in said sockets for adjustment relative to the platform frame, bolts threaded in said frame and having threaded engagement with the upper ends of the legs and means on the bolts for locking the legs against movement in their adjusted positions, a pair of stepped members connected with the legs and adapted to support a plurality of swinging bearings, and swinging frames linked to the stepped members and carrying agate bearings adapted to rest upon the knife edge bearings of the scale mechanism.

3. In a scale, a platform frame formed from one piece of material and having depending sockets formed thereon and countersunk recesses provided in its upper side in alinement with said sockets, threaded bolts seated in said countersunk portions of the frame and extending into the sockets, adjustable legs threaded in said sockets and having threaded engagement with said bolts, a pair of stepped members connected with the legs and adapted to support a plurality of swinging bearings, and swinging frames linked to the stepped members and carrying agate bearings adapted to rest upon the knife edge bearings of the scale mechanism.

4. In a scale, an annular integral platform frame having depending sockets to receive the ends of a plurality of downwardly projecting legs, adjustable legs fitted to the depending sockets, bolts having a screw threaded connection with the legs for adjustably connecting the legs with the frame, means for locking the legs when adjusted against accidental displacement, a pair of stepped members connected with the legs adapted to support a plurality of swinging bearings, and swinging frames linked to the stepped members carrying agate bearings adapted to rest upon the knife edge bearings of the scale mechanism.

5. In a scale, an annular integral platform frame having depending sockets to receive the ends of a plurality of downwardly projecting legs, adjustable legs fitted to the sockets, depending bolts having a screw threaded connection with the legs for adjustably connecting the legs with the frame, means for locking the legs when adjusted against accidental displacement comprising a nut having a screw threaded engagement with the respective legs and adapted to bear against the end of the depending sockets of the frame when adjusted, a pair of stepped members connected with the legs adapted to support a plurality of swinging bearings, and swinging frames linked to the stepped members carrying agate bearings adapted to rest upon the knife edge bearings of the scale mechanism.

6. In a scale, a platform frame having adjustable depending legs, a pair of stepped members connected with the legs, a plurality of foot brackets secured to the stepped members, said brackets comprising two opposing elements adapted to receive between them a transverse pin, a transverse pin for each bracket and a plurality of swinging frames adapted to support an agate bearing each having a bail looped around the transverse pin of the respective foot brackets, whereby the swinging frame bearings are linked as a single unit with the platform frame.

7. In a scale, a platform frame provided with adjustable depending legs, means connected with the lower end of the legs adapted to support a foot bracket, a plurality of foot brackets adjustably connected with the supporting means, said foot brackets comprising two members connected together and to the supporting means by screws, a transverse pin clamped between the members of each foot bracket adapted to engage a swinging agate bearing frame, and a plurality of agate bearing frames each having a bail looped around the transverse pin of its respective foot bearing.

In testimony whereof, I sign this specification in the presence of two witnesses.

C. EDWARD RIEDEL.

Witnesses:
SAMUEL E. THOMAS,
LENA WEIGAND.

Copies of this patent may be obtained for five cents each, by addressing the "Commissioner of Patents, Washington, D. C."